FIG. 1

INVENTOR.
James E. Hawkins
Robert S. Finn
BY Mason and Wyss
Attys.

Patented July 4, 1950

2,513,317

UNITED STATES PATENT OFFICE 2,513,317

RADIO POSITION DETERMINING SYSTEM

James E. Hawkins and Robert S. Finn, Tulsa, Okla., assignors to Seismograph Service Corporation, Tulsa, Okla., a corporation of Delaware Application October 9, 1947, Serial No. 778,796

36 Claims. (Cl. 343—105)

The present invention relates to radio position finding systems and more particularly to improvements in radio position finding systems of the hyperbolic, continuous wave type employing phase comparison in pairs of position indication signals radiated from at least three spaced transmitting points to provide indications from which the position of a mobile receiving point relative to the known positions of the transmitting points may be determined.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by equiphase lines which are hyperbolic in contour about the transmitting points as foci. On a line bisecting the pair of transmitters, these equi-phase lines are spaced apart a distance equal to one-half the mean wave length of the radiated waves and have diverging spacings at points on either side of this line. With this system arrangement, the position of a receiving point relative to a pair of hyperbolic equi-phase lines may be determined by measuring the phase relationship between continuous waves radiated from the pair of transmitters. Since the point of location of the receiving point along the zone separating the two equi-phase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate insofar as the postition indications produced at the receiving point are concerned. To obtain the desired indication accuracy, however, it is necessary to maintain phase synchronization between the continuous waves radiated by the spaced transmitters, or alternatively, so to arrange the system that phase shifts between the radiated waves are compensated during the phase comparing operation. Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of service required in position determining systems. To obviate this problem, systems of the continuous wave hyperbolic type have been proposed (see Honore Patent No. 2,148,267) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of equi-phase lines. While the described arrangement for obviating the phase problem completely solves this problem, it entails the use of two carrier channels in addition to the three or four channels taken up by the three or four continuously operating survey transmitters, in order to make up a complete system. It is also desirable that the channel frequencies be located adjacent the broadcast band or at least below the ultrahigh frequency band in order to obviate the problem of line-of-sight transmission. This, of course, means location of a number of channel frequencies in the most crowded portion of the frequency spectrum, at least insofar as operations in the United States are concerned.

It is an object of the present invention, therefore, to provide an improved radio position determining system of the character described which is free of wave synchronization difficulties of the character mentioned and in which the number of frequency channels required for operation of a complete three transmitting unit system is reduced to a minimum.

According to a further object of the invention, the number of frequency channels required is minimized by so arranging the system that two of the three transmitting units forming a complete system are alternately employed to radiate the required position indicating and reference signals.

It is still another object of the invention to provide a radio position determining system of the character described which is so arranged that not more than two (and by appropriate selection of the frequencies, one) 10 kilocycle band of the frequency spectrum embraces all of the carrier and side band frequencies required for operation of a complete three transmitting unit system.

It is a further object of the invention to provide an improved wave signal transmission system uniquely adapted for use in a position determining system of the character described.

It is a still further object of the invention to provide improved and exceedingly simple wave signal receiving and translating apparatus uniquely adapted for use in a position determining system of the character indicated.

The invention, both as to its organization and method of operation, together with further objects and advantages thereof, will best be understood by reference to the specification taken in connection with the accompanying drawings, in which.

Figure 1:
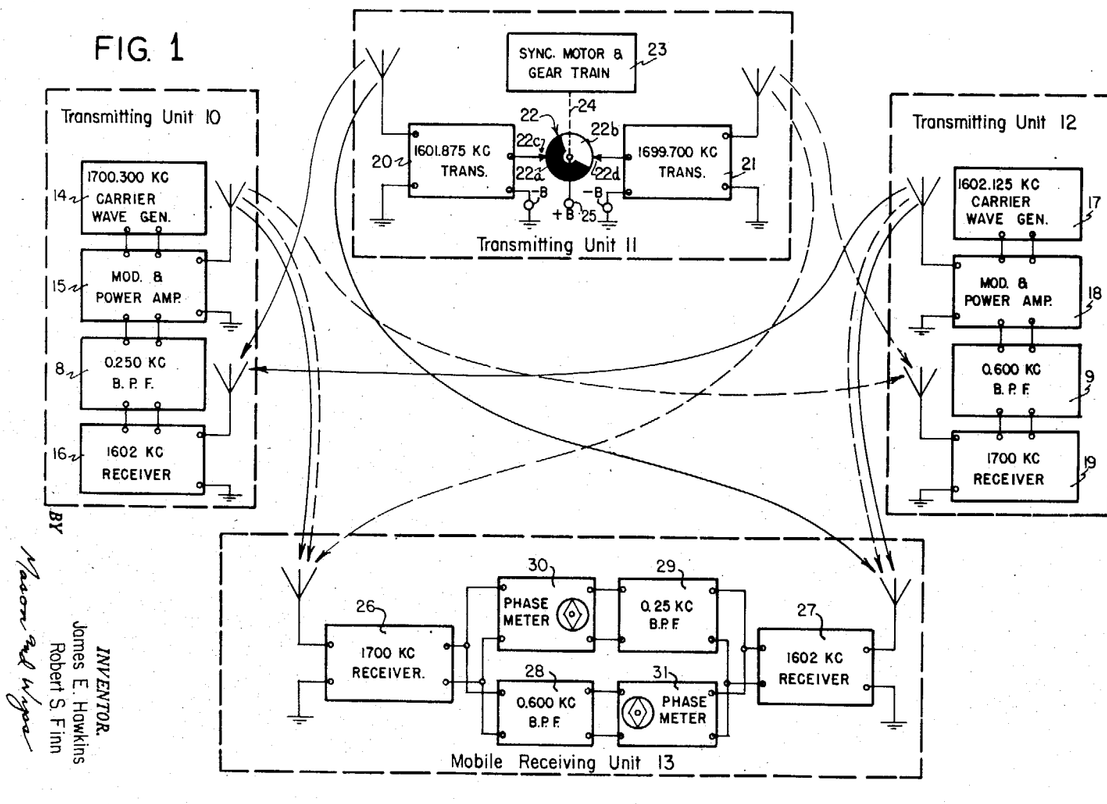
Fig. 1 diagrammatically illustrates an improved radio position determining system characterized by the features of the present invention.

Referring now to the drawings and more particularly to Fig. 1 thereof, the present invention is there illustrated in its embodiment in a system for providing position information at a mobile receiving unit 13 which may be carried by a vessel or vehicle operating within the radius of transmission of three spaced transmitting units 10, 11, and 12. These units are preferably spaced apart approximately equal distances and are so positioned that the line bisecting the points of location of the units 10 and 11 is angularly related to the line bisecting the points of location of the units 11 and 12. As described more fully below, the transmitting units 10 and 12 are equipped continuously to radiate position indicating signals in the form of carrier waves of different frequencies, whereas the transmitting unit 11 is equipped alternately to radiate two additional position indicating signals in the form of carrier waves of still different frequencies. Specifically, the transmitter embodied in the unit 10 comprises a carrier wave generator or oscillator 14 and a modulator and power amplifier unit 15. Similarly, the transmitter embodied in the transmitting unit 12 comprises a carrier wave oscillator or generator 17 and a modulator and power amplifier unit 18. The transmitting unit 11 comprises two transmitters 20 and 21 for respectively radiating position indicating carrier waves at two different carrier frequencies, together with switching means for alternately rendering these two transmitters operative. In the arrangement illustrated, keying of the two transmitters 20 and 21 for alternate operation is accomplished by alternately feeding anode current to the electron discharge tubes of the respective transmitters from the positive terminal 25 of the anode current source, not shown, through a commutating ring 22 which is shaft connected by means of a shaft 24 to be driven at a constant speed by synchronous motor and gear train unit 23. More specifically, the positive terminal 25 of the anode current source is connected to the conductive segment 22b of the commutating ring 22, which segment spans slightly less than half the circumference of the ring. The remainder of the ring is comprised of an insulating segment 22a. At diametrically opposed points around the circumference of the ring, brushes 22c and 22d are provided which engage the ring periphery. These brushes are respectively connected to the positive bus conductors of the two transmitters 20 and 21, such that anode current is alternately delivered to the electron discharge tubes of the two transmitters. Since the conductive segment 22b of the ring 22 represents slightly less than half the periphery surface of the ring, it will be understood that a short off-signal period is provided between successive periods during which the transmitters 20 and 21 are alternatively operated, thus preventing simultaneous radiation of waves by both transmitters. The periodicity with which the two transmitters 20 and 21 are alternately operated is, of course, dependent upon the speed of rotation of the commutating ring 22. Preferably, this ring is driven at a speed of one revolution per second such that the transmitters 20 and 21 are each rendered operative at one-half second intervals.

As indicated above, the carrier frequencies at which the four transmitters of the three transmitting units 10, 11, and 12 operate are all different. Preferably, however, these carrier waves are so paired that the frequencies of each pair are well within a single channel allocation of 10 kilocycles as specified by the Federal Communications Commission of the United States Government. To this end, the output frequency of the transmitter 20 and the output frequency of the transmitter in the unit 12, forming the first transmitter pair, may be 1601.875 and 1602.125 kilocycles respectively, such that the difference frequency therebetween is 0.250 kilocycle, while the output frequencies of the transmitter 21 and the transmitter of the unit 10, forming the second transmitter pair, may be 1699.700 and 1700.300 kilocycles, respectively, such that the difference frequency therebetween is 0.600 kilocycle. It will be noted that the channels in which the two pairs of carrier frequencies fall are separated in the frequency spectrum by approximately 100 kilocycles, thus facilitating selective reception of these carrier pairs in the manner more fully explained below. The power of the four transmitters is such that the entire area in which position information may be desired aboard the vehicle or vessel carrying the receiving unit 13 is blanketed with waves radiated from each of the four transmitters and that these waves have a field strength at all points within this area sufficient to permit reliable reception without requiring undue sensitivity of the receiving equipment.

In order to obviate the above-mentioned difficulties attendant with phase synchronization of the position indication carrier waves radiated by the four transmitters, while at the same time eliminating the necessity for utilizing additional frequency channels, means are provided in the transmitting units 10 and 12 for alternately modulating the waves radiated by the transmitters of the units 10 and 12 with reference signals representative of the difference frequencies between the carrier wave pairs. These reference signals may be received at any receiving point, such as for example, as at the mobile receiving unit 13, located within the radius of transmission of the four transmitters. The equipment for this purpose as provided at the transmitting unit 10 comprises a fixed tuned amplitude modulation receiver 16, center tuned to a frequency of 1602 kilocycles and sharply selective to the 1601.875 and 1602.125 kilocycle carrier waves respectively radiated by the transmitter 20 and the transmitter of the unit 12. The selectivity of this receiver is obviously such that the carrier waves radiated by the transmitter 21 and the transmitter of the unit 10 are rejected in the radio frequency section thereof. The beat frequency of 0.250 kilocycle between the two carriers accepted by the radio frequency section of the receiver 16 is reproduced in the audio frequency section of this receiver and delivered to the modulator 15 for amplitude modulation upon the carrier output of the transmitter embodied in the unit 10 through a narrow band pass filter 8, which is center tuned to a frequency of 0.250 kilocycle. Similarly, the transmitting unit 12 is equipped with a fixed tuned amplitude modulation receiver 19 which is tuned to a carrier frequency of 1700 kilocycles and is sharply selective to the 1699.700 and 1700.300 kilocycle waves respectively radiated by the transmitter 21 and the transmitter of the unit 10. Here again, the selectivity of the receiver 19 is obviously such that the carrier waves radiated by the transmitter 20 and the transmitter of the unit 12 are rejected in the radio frequency section of the receiver. The beat frequency of 0.600 kilocycle between the two carrier waves accepted by the receiver 19 are reproduced in the audio frequency section thereof and modulated upon the carrier wave output of the transmitter embodied in the transmitting unit 12 through a narrow band pass filter 9 which is center tuned to a frequency of 0.600 kilocycle.

Referring now particularly to the equipment making up the mobile receiving unit 13, it is pointed out that this equipment comprises a fixed tuned amplitude modulation receiver 26, a second fixed tuned amplitude modulation receiver 27, a pair of phase angle meters 30 and 31 and a pair of narrow band pass filters 28 and 29 center tuned respectively to frequencies of 0.600 and 0.250 kilocycle. More specifically, the receiver 26 is fixed tuned to a carrier frequency of 1700 kilocycles and is designed to accept the carrier wave radiated by the transmitter 21 and the carrier wave radiated by the transmitter of the unit 10 both when modulated and unmodulated. Similarly, the receiver 27 is fixed tuned to a carrier frequency of 1602 kilocycles and is designed to accept the carrier wave radiated by the transmitter 20 and the carrier wave radiated by the transmitter of the unit 12 both when modulated and unmodulated. The filters 28 and 29, which may be of any standard commercial construction, perform the function of selecting the heterodyne or difference frequency signals alternately developed at the output terminals of the receivers 26 and 27, respectively, and delivering these signals to the phase meters 31 and 30, respectively. Preferably these meters are of the general character disclosed in Patent No. 1,762,725—Marrison, granted June 10, 1930, and are capable of measuring phase angles in excess of 360 electrical degrees between two impressed signal voltages. Each phase meter is equipped with a rotatable rotor carrying a pointer which indexes with a circular scale to indicate the phase relationship between the two impressed voltages. If desired, each meter may also be equipped with a revolution counter, gear driven from the rotor element of the meter to count the equi-phase lines traversed by the mobile receiving unit 13.

In considering the operation of the above-described position determining system, it will be understood that when the motor and gear train unit 23 is operating to drive the commutating ring 22, anode current is alternately delivered to the electron discharge tubes of the transmitters 20 and 21, such that these transmitters are alternately rendered operative to radiate carrier waves at frequencies of 1601.875 and 1699.700 kilocycles, respectively. The transmitters of the units 10 and 12, on the other hand, operate continuously. Accordingly, during each interval when the transmitter 20 is in operation, the carrier waves of 1601.875 and 1602.125 kilocycles respectively radiated by the transmitter 20 and the transmitter of the unit 12 are picked up and heterodyned in the radio frequency sections of the receivers 16 and 27. In the receiver 16, the difference frequency signal of 0.250 kilocycle is reproduced in the audio section of the receiver, passed by the filter 8 and modulated upon the carrier wave output of the transmitter in the unit 10 for radiation as a reference signal. This modulated carrier wave is received by the receiver 26 of the mobile receiving unit 13 and the 0.250 kilocycle modulation component is reproduced at the output terminals of this receiver. During the period indicated, the transmitter 21 is not in operation and hence no heterodyne or beat frequency signal is developed by the receiver 26. The 0.250 kilocycle reference signal as thus reproduced by the receiver 26 is applied to the left set of input terminals of the phase meter 30 and also to the input terminals of the 0.600 kilocycle band pass filter 28. This filter rejects the applied signal and thus prevents the same from being applied to the left set of input terminals of the phase meter 31.

The 0.250 kilocycle beat frequency or heterodyne signal resulting from heterdyning of the carriers radiated by the transmitter 20 and the transmitter of the unit 12 in the radio frequency section of the receiver 27 is reproduced across the output terminals of this receiver and is applied to the right set of terminals of the phase meter 31 and the input terminals of the 0.250 kilocycle band pass filter 29 in parallel. Since the filter 28 prevents a signal from being applied to the left set of input terminals of the phase meter 31, this phase meter does not respond to the signal voltage applied to its right set of input terminals by the receiver 27. The filter 29, however, passes the signal developed across the output terminals of the receiver 27 and applies the same to the right set of the input terminals of the phase meter 30. Thus two signal voltages of identical frequency are applied to the two sets of input terminals of the phase meter 30, with the result that this phase meter functions to measure the phase angle therebetween. This phase angle indication is accurately representative of the position of the receiving unit 13 between two equiphase lines of the standing waves produced in space as a result of the carrier wave radiation by the transmitter 20 and the transmitter of the unit 12.

At the end of the described transmitting interval, the commutating ring 22 functions to interrupt the circuit for delivering anode current to the tubes of the transmitter 20, with the result that carrier wave radiation from this transmitter is terminated. When radiation of this wave stops, the carrier heterodyning action of the two receivers 16 and 27 is likewise terminated to interrupt the reference signal radiation by the transmitter of the unit 10 and to interrupt the heterodyne or difference frequency signal being developed across the output terminals of the receiver 27. Thus the phase meter 30 is rendered ineffective further to change the setting of its indicating element.

A short time interval after operation of the transmitter 20 is stopped, the commutating ring 22 functions to deliver anode current to the tubes of the transmitter 21 and thus initiate operation of this transmitter. With the transmitter 21 in operation, a 1699.700 kilocycle position indicating carrier wave is radiated thereby which is accepted by the receivers 19 and 26. More specifically, the receiver 19 functions to heterodyne the carrier wave radiated by the transmitter 21 with the carrier wave radiated by the transmitter of the unit 10 and to reproduce the heterodyne or difference frequency signal of 0.600 kilocycle in the audio frequency section thereof. This difference frequency or reference signal is passed by the filter 9, modulated upon the output carrier wave of the generator 17 in the modulator and power amplifier unit 18 and radiated as a modulation component upon the carrier wave transmitted by the transmitter of the unit 12 to the receiver 27. This receiver accepts the modulated carrier wave and reproduces the modulation component thereof in the usual manner. The reference signal thus developed across the output terminals of the receiver 27 is applied across the right set of input terminals of the phase meter 31 and the input terminals of the band pass filter 29 in parallel. This filter functions to reject the applied reference signal voltage and thus prevent the same from being impressed across the right set of input terminals of the phase meter 30. It will be understood that the receiver 27 is incapable of accepting the carrier wave radiated by the transmitter of the unit 10. Hence this receiver is prevented from heterodyning the carrier wave radiated by the transmitter of the unit 10 with the carrier wave radiated by the transmitted of the unit 12.

The 1699.700 and 1700.300 kilocycle waves respectively radiated by the transmitter 21 and the transmitter of the unit 10 are both accepted by the receiver 26 and heterodyned in the radio frequency section thereof to produce a heterodyne or difference frequency signal which is produced across the output terminals of the receiver and applied to the left set of input terminals of the phase meter 30 and the input terminals of the filter 28 in parallel. Since no signal voltage is applied to the right set of terminals of the phase meter 30 when the transmitter 21 is operating, this phase meter remains inactive. The reference signal of 0.600 kilocycle applied to the input terminals of the filter 28 is passed by this filter and applied to the left set of input terminals of the phase meter 31. Thus reference and heterodyne or difference frequency signals of identical frequencies are respectively applied to the two sets of input terminals of the phase meter 31. This phase meter functions to measure the phase relationship between the two applied signal voltages and thus provide an indication accurately representative of the position of the receiving unit 13 between two equi-phase lines of the standing waves produced in space by the radiation of position indicating carrier waves from the transmitter 21 and the transmitter at the unit 10.

At the end of the described transmitting interval, the commutating ring 22 functions to interrupt anode current flow to the tubes of the transmitter 21 and thus arrest operation of this transmitter. When carrier wave radiation by the transmitter 21 is thus terminated, the wave heterodyning action effected in the receivers 19 and 26 is instantly stopped to terminate the radiation of 0.600 kilocycle reference signal by the transmitter of the unit 12 and to terminate reproduction of the difference or heterodyne signal at the output terminals of the receiver 26. Thus the application of signal voltages to the two sets of input terminals of the phase meter 31 is interrupted, with the result that no further change in the setting of the element of this meter can be produced. A short time interval after operation of the transmitter 21 is arrested, the commutating ring 22 functions to recomplete the circuit for delivering anode current to the tubes of the transmitter 20 and thus reinitiate operation of this transmitter with the results described above.

From the foregoing explanation, it will be understood that the transmitters 20 and 21 in their alternate operation to radiate position indicating carrier waves cooperate with the receivers 16 and 19 of the transmitting units 10 and 12 alternately to render the transmitters of these units operative to radiate position indicating signals and reference signals. More in particular, the position indicating carrier waves alternately radiated by the transmitters 20 and 21 alternately cause the position indicating carrier waves respectively radiated by the transmitters of the units 10 and 12 to be modulated with reference signals during periods when these transmitters are respectively inactive as position indicating signal radiators. In order to illustrate the action which occurs, arrow pointed solid lines have been shown in Fig. 1 of the drawings to indicate the receiving points of signal acceptance and the sources of the accepted signals during each period when the transmitter 20 is operating, and arrow pointed dashed lines have been shown to illustrate the receiving points of signal acceptance and the sources of accepted signals during each period when the transmitter 21 is operating. From a consideration of these lines and reflection upon the above explanation, it will be understood that the receivers 26 and 27 alternately function as reference signal detecting receivers and as heterodyning receivers for developing the required heterodyne or difference frequency signals. Specifically, the receiver 26 functions as a heterodyne receiver in respect to the position indicating carrier waves radiated by the transmitter 21 and the transmitter of the unit 10, and functions as a reference signal reproducing receiver in receiving the reference signal modulated carrier radiated by the transmitter of the unit 10. The receiver 27 on the other hand, functions as a heterodyne receiver in respect to the position indicating carrier waves radiated by the transmitter 20 and the transmitter of the unit 12 and as a reference signal detecting receiver in receiving the reference signal modulated carrier wave radiated by the transmitter of the unit 12.

As will be evident from the above explanation, the phase meter 30 functions to produce a phase angle indication which is representative of the position of the receiving unit 13 between two equi-phase lines of the standing waves produced in space as a result of carrier wave radiation by the transmitter 20 and the transmitter of the unit 12. With the described arrangement, wherein carrier wave frequencies of 1601.875 and 1602.125 kilocycles are employed, the wave length spacing between the equi-phase lines along a line bisecting the units 10 and 12 is determined by the mean frequency of 1602 kilocycles between the two radiated carrier waves. At this particular mean frequency, equi-phase lines representative of the same phase relationship between the standing waves produced by the transmitter 20 and the transmitter of the unit 12 along the line joining the unit 20 and the unit 12 are spaced apart a distance of about 307 feet. Hence the indication provided by the phase meter 30 identifies the position of the receiving unit 13 within a zone not less than 307 feet in width, i. e., a zone having a minimum width equal to one half the wave length of a wave having a frequency equal to the mean frequency of the position indicating carrier waves radiated by the transmitter 20 and the transmitter of the unit 12.

As previously indicated, the indication provided by the phase meter 30, standing alone, is ambiguous for the reason that this indication does not identify the point of location of the receiving unit 13 along the zone separating the two adjacent equi-phase lines of the lines of the standing waves produced in space by the transmitter 20 and the transmitter of the unit 12. Identification of this point is obtained through the response of the receiving unit to the position indicating signals radiated by the transmitter 21 and the transmitter of the unit 10. Thus, the phase meter 31 provides an indication of the position of the receiving point, namely, the unit 13, between two equi-phase lines of the standing waves produced in space by the radiation of position indicating carrier waves from the transmitter 21 and the transmitter of the unit 10. Here again, the wave length spacing of equi-phase lines along a line bisecting the two units 10 and 11 is determined by the mean frequency of 1700 kilocycles between the frequencies of the waves radiated by the transmitter 21 and the transmitter of the unit 10. At this particular mean frequency, equi-phase lines representative of the same phase relationship between the standing waves produced by the two identified transmitters have a minimum spacing of approximately 289 feet, such that the indication provided by the meter 31 identifies the position of the receiving unit 13 within a zone having a 289 foot minimum width. The two indications thus provided by the phase meters 30 and 31 may readily be resolved into distance indications from which the position of the receiving point relative to the two transmitting units 10 and 12 may be determined. With these distances known and the positions of the transmitting units 10 and 12 known, the position of the receiving point may obviously be easily determined.

Figure 2:
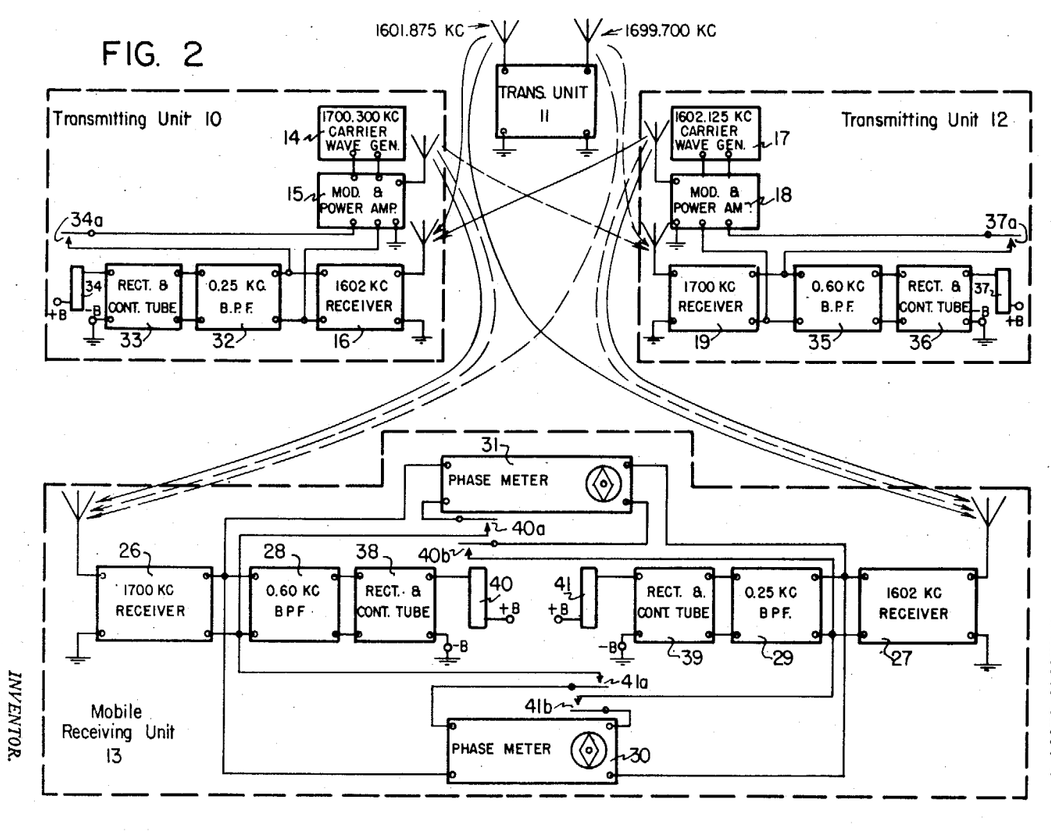
Fig. 2 illustrates a modification of the system shown in Fig. 1.

Referring now more particularly to Fig. 2 of the drawings, the modified system there illustrated includes facilities for eliminating the filters 8, 9, 28, and 29, through which the heterodyne or difference frequency signals are transmitted to the respective modulator stages 15 and 18, and the respective phase meters 31 and 30. This modification has the advantage of eliminating phase shift difficulties which may be encountered by including the filter networks in the identified signal transmission paths unless like ones of these networks are designed to have identical characteristics. Due to the close similarity between the systems of Figs. 1 and 2, corresponding components of the two systems have been identified by the same reference numerals. From an inspection of the Fig. 2 system, it will be apparent that in the transmitting unit 10, the output terminals of the heterodyning receiver 16 are arranged for direct connection to the modulator terminals of the modulating and power amplifying unit 15 through the normally open contacts of a switching relay 34. This relay is operative to close the contacts 34a only when energized by a rectifier and control tube unit 33 in response to excitation of this unit by the 0.250 kilocycle input voltage which is developed and passed by the filter 32 when the heterodyning receiver 16 is active to perform its heterodyning function. Similarly, the output terminals of the heterodyning receiver 19 embodied in the transmitting unit 12 are arranged to be connected directly to the modulator input terminals of the unit 18 through the normally open contacts of a switching relay 37. This relay is arranged to be energized under the control of a rectifier and control tube 36 and a filter 35 only when the heterodyne receiver 19 is active to perform its assigned heterodyning function.

In the receiving unit 13, the output terminals of the receivers 26 and 27 are arranged to be connected respectively to the left and right sets of input terminals of the phase meter 31 through normally open contacts 40a and 40b of a switching relay 40 which is energized under the control of a rectifier and control tube unit 38 and the narrow band pass filter 28 only when the receiver 26 functions as a heterodyning receiver in the manner explained above. Similarly, the output terminals of the two receivers 26 and 27 are arranged to be connected to the left and right sets of input terminals of the phase meter 30 through the normally open contacts 41a and 41b of a switching relay 41 under the control of a rectifier and control tube unit 39 and the narrow band pass filter 29 only when the receiver 27 is operating as a heterodyning receiver. Aside from the modifications just referred to, the system shown in Fig. 2 of the drawings is identical with that shown in Fig. 1 of the drawings and described above.

With the exception of the manner in which the switching operations are performed, the mode of operation of the Fig. 2 system is also identical with that of the system shown in Fig. 1 of the drawings. Briefly to consider the manner in which the receiver switching functions are accomplished, it is pointed out that when a 1601.875 kilocycle carrier wave is being radiated by the transmitter unit 11, this wave is heterodyned with the wave radiated by the transmitter of the unit 12 in the receiver 16 to produce a difference frequency output signal of 0.250 kilocycle which is reproduced across the output terminals of this receiver, and passed by the filter 32 to excite the rectifier and control unit 33, with the result that the relay 34 is operated to close its contacts 34a. In closing these contacts, the relay 34 connects the output terminals of the receiver 16 directly to the modulator terminals of the unit 15, with the result that the carrier wave output of the transmitter in the unit 10 is modulated with the reference signal of 0.250 kilocycle. In a similar manner, the receiver 27, filter 29, and rectifier and control tube unit 39 function to effect operation of the switching relay 41 when a 1601.875 kilocycle carrier wave is radiated by the transmitting unit 11 to produce the described carrier wave heterodyning action in the receiver 27. In operating, the relay 41 closes its contacts 41a and 41b to connect the left and right sets of input terminals of the phase meter 30 respectively to the output terminals of the receivers 26 and 27. Thus, the phase meter 30 is connected directly to the output terminals of the two receivers to perform the required phase measuring operation. When radiation of the 1601.875 kilocycle carrier wave by the transmitting unit 11 is terminated, the difference frequency signals appearing at the output sides of the receivers 16 and 27 are likewise terminated to effect deenergization of the relays 34 and 41 in an obvious manner. In releasing, the relay 34 opens its contacts 34a to interrupt the signal transmission path between the output signals of the receiver 16 and the modulator and power amplifier unit 15. The relay 41, upon restoring, opens its contacts 41a and 41b to disconnect the phase meter 30 from the output terminals of the receivers 26 and 27.

During each period when the transmitting unit 11 is operating to radiate a position indicating carrier wave of 1699.700 kilocycles the receivers 19 and 26 function to develop heterodyne or beat frequency signals at the output sides thereof. As a result, the relays 37 and 40 are energized and operate for reasons clearly apparent from the above explanation. The relay 37, upon operating, closes its contacts 37a to connect the output terminals of the receiver 19 to the modulator terminals of the modulator and power amplifier unit 18, thereby to effect modulation of the reference signal appearing across the output terminals of the receiver 19 upon the carrier wave radiated by the transmitter of the unit 12. The relay 40, in operating, closes its contacts 40a and 40b to connect the two sets of input terminals of the phase meter 31 directly and respectively to the output terminals of the receivers 26 and 27. Thus, the phase meter 31 is connected to perform the desired phase measuring operation. Here again, the relays 37 and 40 are deenergized and restore when radiation of the 1699.700 kilocycle wave from the transmitting unit 11 is terminated. In releasing, the relay 37 disconnects the receiver 19 from the modulator and power amplifier unit 18, and the relay 40 disconnects the input terminals of the phase meter 31 from the respective sets of output terminals of the receivers 26 and 27. It will thus be evident that the two pairs of switching relays 34, 41 and 37, 40 operate alternately and recurrently to condition the transmitting units 10 and 12 and the receiving unit 13 for radiation of the required reference signals and for direct comparison of these signals with the heterodyne or beat frequency signals developed locally in the receiving unit 13. In each case, the switching functions are selectively motivated by the two different position indicating carrier waves alternately radiated by the transmitting unit 11.

From the above explanation, it will be apparent that the present invention affords a satisfactory solution to the problem of minimizing the number of frequency channels required to form a complete radio position determining system. Thus, in the arrangement specifically described above, all radiated signals are embraced within two channels of less than 5 kilocycle width having an interchannel spacing of approximately 100 kilocycles. Without modification of the system, however, it is entirely possible to confine all of the waves radiated by the four transmitters to a single band having a width of less than 10 kilocycles. This may be accomplished, for example, by designing the transmitters 20 and 21 and the transmitters of the two units 10 and 12 to operate at the following carrier frequencies:

| Transmitter | Frequency |
|---|---|
| | Kc. |
| 20 | 1601.875 |
| 12 | 1602.125 |
| 21 | 1608.700 |
| 10 | 1609.300 |

While the use of frequencies of the values specified materially increases the selectivity requirements of the receivers used in the system, it is entirely possible to obtain the required selectivity with well designed receivers of standard construction. It will be noted that even when frequencies of the values specified are employed, the side band frequencies of 0.250 and 0.600 kilocycle in no case causes a change in radiated signal frequency which results in overlapping an adjacent 10 kilocycle channel. Not only does the described system satisfactorily obviate the problem of minimizing channel requirements, but in addition, it minimizes the amount of equipment required to form a complete system. Further, the components making up each receiving unit 13 are simple in the extreme and may easily be operated by non-skilled personnel. Moreover, the system has the advantage that standard and well known components may be employed throughout as regards both the transmitting and receiving equipment.

While different embodiments of the invention have been described, it will be understood that various modifications may be made therein which are within the true spirit and scope of the invention as defined in the appended claims.

We claim:

1. In a position determining system having a receiving point, a pair of spaced transmitters for radiating position signals, means for alternately modulating the signals radiated by said transmitters with reference signals, and receiving and translating apparatus at said receiving point jointly responsive to said position indicating and reference signals for producing two indications respectively representative of the position of said receiving point relative to different ones of said transmitters.

2. In a position determining system having a receiving point, a pair of spaced transmitters, a transmitting unit spaced from each of said transmitters and including means for intermittently radiating at least one position indicating signal, means at least in part responsive to said signal for rendering at least one of said transmitters alternately operative to transmit position indicating and reference signals, and receiving and translating apparatus at said receiving point jointly responsive to said position indicating and reference signals for producing two indications respectively representative of the position of said receiving point relative to different ones of said transmitters.

3. In a position determining system having a receiving point, a pair of spaced transmitters continuously operative to radiate distinguishable position indicating signals, additional transmitting apparatus spaced from each of said transmitters and including means for radiating at least one other position indicating signal, means at least in part responsive to said last-named signal for intermittently modulating the signal radiated by at least one of said transmitters with a reference signal, and receiving and translating apparatus at said receiving point jointly responsive to said position indicating and reference signals for producing two indications respectively representative of the position of said receiving point relative to different ones of said transmitters.

4. In a position determining system having a receiving point, a pair of spaced transmitters continuously operative to radiate distinguishable position indicating signals, additional transmitting apparatus spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said additional transmitting apparatus for alternately modulating the signals radiated by said transmitters with reference signals, and receiving and translating apparatus at said receiving point alternately responsive to said reference signals and different pairs of said position indicating signals for alternately producing indications representative of the position of said receiving point relative to different ones of said transmitters.

5. In a position determining system having a receiving point, a pair of spaced transmitters continuously operative to radiate distinguishable position indicating signals, additional transmitting apparatus spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said additional transmitting apparatus for alternately modulating the signals radiated by said transmitters with reference signals having frequencies respectively equaling the difference frequencies of the heterodyned signals, a pair of receivers at said receiving point each operative to receive and reproduce a different one of said reference signals, said last-named receivers also being alternately operative to heterodyne the position indicating signals which have a difference frequency equaling the frequency of the reference signal being reproduced by the other receiver of said pair and to reproduce the difference frequency signal, whereby two pairs of signals of matching frequencies are alternately developed at said receiving point, and phase measuring means at said receiving point for measuring the phase relationship between the signals of each pair, thereby alternately to produce indications representative of the position of said receiving point relative to different ones of said transmitters.

6. A position determining system comprising a pair of spaced transmitters for radiating waves of different frequencies to a receiving point, additional transmitting apparatus spaced from said transmitters and including means for alternately radiating to said receiving point two other waves at still different frequencies, means responsive to at least one of the waves radiated by said additional transmitting apparatus for alternately modulating the waves radiated by said two transmitters with reference signals, and receiving and translating apparatus at said receiving point jointly responsive to said waves and said reference signals for producing two indications respectively representative of the position of said receiving point relative to different ones of said transmitters.

7. A position determining system comprising a pair of spaced transmitters for radiating waves of different frequencies to a receiving point, a transmitting unit spaced from said transmitters and including means for alternately radiating to said receiving point two other waves at still different frequencies, one of the waves radiated by said transmitting unit differing from the wave radiated by one of said transmitters by a first predetermined difference frequency and the other of the waves radiated by said transmitting unit differing from the wave radiated by the other of said transmitters by a second predetermined difference frequency, means responsive to the waves radiated by said transmitting unit for alternately modulating the wave radiated by said one transmitter with a reference signal having a frequency related to said second difference frequency and for modulating the wave radiated by said other transmitter with a reference signal having a frequency related to said first difference frequency, and receiving and translating apparatus at said receiving point jointly responsive to said waves and said reference signals for producing two indications respectively representative of the position of said receiving point relative to different ones of said transmitters.

8. A wave signal transmission system for radiating position indicating signals, comprising two spaced transmitters for radiating waves at different frequencies, two other transmitters for radiating waves at still different frequencies, means for alternately rendering said other transmitters operative, and means responsive to the waves radiated by said other transmitters for alternately modulating the waves radiated by said first-named transmitters with reference signals.

9. A wave signal transmission system for radiating position indicating signals, comprising a first pair of spaced transmitters for radiating waves at different frequencies, a second pair of spaced transmitters for radiating waves at still other frequencies, means for alternately rendering operative one transmitter of each pair, and means responsive to the waves radiated by said one transmitter of each pair for alternately modulating the waves radiated by the other transmitter of each pair with a reference signal having a frequency related to the difference frequency between the frequencies of the waves radiated by the transmitters of the pair which includes the operating one of said alternatively operated transmitters.

10. In a position indicating system of the type requiring the transmission of signals from both position indicating transmitters which radiate position indicating signals and link transmitters which radiate reference signals, a pair of spaced transmitters for radiation position indicating signals, additional transmitting apparatus spaced from each of said transmitters for radiating at least one other position indicating signal, and means responsive to operation of said additional transmitting apparatus for alternately converting said pair of transmitters into link transmitters.

11. In a position indicating system of the type requiring the transmission of signals from both position indicating transmitters which radiate position indicating signals and link transmitters which radiate reference signals, a pair of spaced transmitters for radiating position indicating signals, additional transmitting apparatus spaced from each of said transmitters and including means for alternately radiating two other position indicating signals, and means selectively responsive to different ones of said other position indicating signals for alternately converting said pair of transmitters into link transmitters.

12. A wave signal transmission system for radiating position indicating waves, comprising two spaced transmitters for radiating waves at different frequencies, a transmitting unit spaced from each of said pair of transmitters and including means for alternately radiating waves at two still different frequencies, and means responsive to the waves radiated by said transmitting unit for alternately modulating the waves radiated by said two transmitters with reference signals.

13. A wave signal transmission system, comprising three spaced transmitting units for radiating two pairs of waves, all of said waves having different frequencies, one of said units including means for alternately radiating one wave of each pair, and means responsive to the waves radiated by said one unit for alternately modulating the waves radiated by the other units with reference signals having different frequencies respectively related to the difference frequencies between the waves of said two pairs.

14. A wave signal transmission system, comprising three spaced transmitting units for radiating two pairs of waves, all of said waves having different frequencies, one of said units including means for alternately radiating one wave of each pair, and means associated with at least a first of the other units and responsive only to one of the waves radiated by said one unit for intermittently modulating the wave radiated by said first unit with a reference signal having a frequency related to the difference frequency between the frequency of said one wave and the frequency of the wave radiated by the second of said other units.

15. A wave signal transmission system, comprising three spaced transmitting units for radiating two pairs of waves, all of said waves having different frequencies, one of said units including means for alternately radiating one wave of each pair, and means respectively associated with each of the first and second of the other two units and selectively responsive to one and then the other of the waves radiated by said one unit for alternately modulating the wave radiated by said first unit with a reference signal having a frequency related to the difference frequency between the frequency of said one wave and the wave radiated by said second unit and modulating the wave radiated by said second unit with a second reference signal having a frequency related to the difference frequency between the frequency of said other wave and the frequency of the wave radiated by said first unit.

16. A wave signal transmission system, comprising three spaced transmitting units for radiating two pairs of waves, all of said waves having different frequencies, one of said units including means for alternately radiating one wave of each pair, receiving means associated with a first of the other two units and selectively responsive only to one of the waves radiated by said one unit for heterodyning said one wave with the wave radiated by the second of said other two units and for modulating the difference frequency signal upon the wave radiated by said first unit, and receiving means associated with said second unit and responsive only to the other of the waves radiated by said one unit for heterodyning said other wave with the wave radiated by said first unit and for modulating the difference frequency signal upon the wave radiated by said second unit.

17. A wave signal transmission system, comprising three spaced transmitting units for radiating two pairs of waves, all of said waves having different frequencies, one of said units including means for alternately radiating one wave of each pair, receiving means associated with a first of the other two units and selectively responsive only to one of the waves radiated by said one unit for heterodyning said one wave with the wave radiated by the second of said other two units and for reproducing the difference frequency signal, switching means responsive to said difference frequency signal for impressing said signal upon the wave radiated by said first unit, receiving means associated with said second unit and responsive only to the other of the waves radiated by said one unit for heterodyning said other wave with the wave radiated by said first unit and for reproducing the difference frequency signal, and switching means responsive to said last-named difference frequency signal for impressing said last-named signal upon the wave radiated by said second unit.

18. Wave signal receiving apparatus for translating received space radiated waves into position indications, comprising a receiver for receiving a first pair of space radiated waves and for heterodyning said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver for receiving and heterodyning said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, and phase measuring means for measuring the phase relationship between said first heterodyne and second reference signals and between said second heterodyne and first reference signals to provide two indications respectively representative of the position of said receiving apparatus relative to two displaced sources of said waves.

19. Wave signal receiving apparatus for translating received space radiated waves into position indications, comprising a receiver for receiving a first pair of space radiated waves and for heterodyning said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver for receiving and heterodyning said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, phase measuring means for measuring the phase relationship between said first heterodyne and second reference signals and between said second heterodyne and first reference signals to provide two indications respectively representative of the position of said receiving apparatus relative to two displaced sources of said waves, and means comprising filters coupled to the output sides of said receivers and tuned respectively to said heterodyne signals for selectively rendering said phase measuring means operative to measure the phase relationship between different pairs of said signals.

20. Wave signal receiving apparatus for translating received space radiated waves into position indications, comprising a receiver for receiving a first pair of space radiated waves and for heterodyning said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver for receiving and heterodyning said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, phase measuring means for measuring the phase relationship between said first heterodyne and second reference signals and between said second heterodyne and first reference signals to provide two indications respectively representative of the position of said receiving apparatus relative to two displaced sources of said waves, and filters coupled to the output sides of said receivers and tuned respectively to said heterodyne signals for selectively passing said heterodyne signals to said phase measuring means.

21. Wave signal receiving apparatus for translating received space radiated waves into position indications, comprising a receiver for receiving a first pair of space radiated waves and for heterodyning said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver for receiving and heterodyning said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, a first phase measuring device for measuring the phase relationship between said first heterodyne signal and said second reference signal to provide an indication of the position of said receiving apparatus relative to the source of one of said waves, a second phase measuring device for measuring the phase relationship between said second heterodyne signal and said first reference signal to provide an indication of the position of said receiving apparatus relative to the source of a second of said waves, and means including filters coupled to the output sides of said receivers and tuned respectively to said heterodyne signals for selectively rendering said phase measuring devices operative to measure the phase relationship between said signals.

22. Wave signal receiving apparatus for translating received space radiated waves into position indications, comprising a receiver for receiving a first pair of space radiated waves and for heterodyning said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver for receiving and heterodyning said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, a first phase measuring device for measuring the phase relationship between said first heterodyne signal and said second reference signal to provide an indication of the position of said receiving apparatus relative to the source of one of said waves, a second phase measuring device for measuring the phase relationship between said second heterodyne signal and said first reference signal to provide an indication of the position of said receiving apparatus relative to the source of a second of said waves and filters coupled to the output sides of said receivers and tuned respectively to said heterodyne signals for selectively passing said heterodyne signals to said phase measuring devices.

23. Wave signal receiving apparatus for translating received space radiated waves into position indications, comprising a receiver for receiving a first pair of space radiated waves and for heterodyning said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said pair of radiated waves, a second receiver for receiving and heterodyning said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, phase measuring means for measuring the phase relationship between said first heterodyne and second reference signals and between said second heterodyne and first reference signals to provide two indications respectively representative of the position of said receiving apparatus relative to two displaced sources of said waves, and switching means selectively responsive to at least one of said signals for selectively rendering said phase measuring means operative to measure the phase relationship between said different pairs of said signals.

24. Wave signal receiving apparatus for translating received space radiated waves into position indications, comprising a receiver for receiving a first pair of space radiated waves and for heterodyning said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver for receiving and heterodyning said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, phase measuring means for measuring the phase relationship between said first heterodyne and second reference signals and between said second heterodyne and first reference signals to provide two indications respectively representative of the position of said receiving apparatus relative to two displaced sources of said waves, and switching means selectively responsive to at least one of said heterodyne signals for selectively rendering said phase measuring means non-concurrently operative to measure the phase relationship between said different pairs of said signals.

25. Wave signal receiving apparatus for translating received space radiated waves into position indications, comprising a receiver for receiving a first pair of space radiated waves and for heterodyning said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver for receiving and heterodyning said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, a first phase measuring device for measuring the phase relationship between said first heterodyne signal and said second reference signal to provide an indication of the position of said receiving apparatus relative to the source of one of said waves, a second phase measuring device for measuring the phase relationship between said second heterodyne signal and said first reference signal to provide an indication of the position of said receiving apparatus relative to the source of a second of said waves, and switching means selectively responsive to at least one of said signals for selectively rendering said phase measuring devices non-concurrently operative to measure the phase relationship between said signals.

26. Wave signal receiving apparatus for translating received space radiated waves into position indications, comprising a receiver for receiving a first pair of space radiated waves and for heterodyning said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver for receiving and hetero- dyning said second pair of radiated waves to produce a second heterodyne signal having a frequency equalling the frequency of said first reference signal, said second receiver being alternately operative to receive and reproduce a second reference signal having a frequency representative of the difference frequency between said first pair of waves and modulated upon one of said second pair of waves, a first phase measuring device for measuring the phase relationship between said first heterodyne signal and said second reference signal to provide an indication of the position of said receiving apparatus relative to the source of one of said waves, a second phase measuring device for measuring the phase relationship between said second heterodyne signal and said first reference signal to provide an indication of the position of said receiving apparatus relative to the source of a second of said waves, filters coupled to the output sides of said receivers and tuned respectively to said heterodyne signals for selectively passing said heterodyne signals and rejecting said reference signals, and switching relays selectively responsive to the signals passed by said filters for non-concurrently rendering said phase measuring devices operative to measure the phase relationship between said signals.

27. A wave signal transmission system comprising a transmitter for radiating a position indicating signal, a second transmitter for radiating a second signal at spaced intervals, modulating means responsive to said second signal for modulating said first-mentioned signal with a reference signal during said spaced intervals, and means controlled by said second signal for rendering said modulating means ineffective to modulate said first-mentioned signal during the intervals separating said spaced intervals.

28. A wave signal transmission system comprising three spaced transmitters for radiating signals at different frequencies, means for intermittently rendering one of said transmitters operative to radiate a signal, modulating means responsive to the signals radiated by said one transmitter and by a second of said transmitters for modulating the signal output of the third transmitter with a reference signal during each interval when said one transmitter is operating, and means responsive to off-signal intervals of said one transmitter for rendering said modulating means ineffective to modulate the signal output of said third transmitter during each off-signal interval of said one transmitter.

29. A wave signal transmission system for radiating position indicating signals, comprising two spaced transmitters for radiating signals at different frequencies, additional transmitting apparatus spaced from each of said transmitters and including means for alternately radiating signals at two still different frequencies, modulating means associated with each of said transmitters and jointly responsive to the signal radiated by the other transmitter and one of the signals radiated by said additional transmitting apparatus for modulating the signal radiated by the associated transmitter at spaced intervals, and signal responsive means controlled by the signals radiated by said additional transmitting apparatus for rendering each of said modulating means inactive during the intervals separating the spaced modulating intervals thereof.

30. A wave signal transmission system comprising a first transmitter including means for radiating a signal at one frequency, means for pulsing said signal, a second transmitter for continuously radiating a second signal at a different frequency, and a reference signal transmitter including means for receiving and heterodyning said signals to produce beat frequency signal pulses and means responsive to said beat frequency signal pulses for radiating corresponding reference signal pulses.

31. A wave signal transmission system comprising a first transmitter including means for radiating a signal at one frequency, means for pulsing said signal, a second transmitter for continuously radiating a second signal at a different frequency, a third transmitter for radiating a signal at still another frequency, means for receiving and heterodyning said pulsed and second signals to produce a plurality of beat frequency signal pulses of different frequencies, filter means for selectively passing the beat frequency signal pulses of a particular frequency, and means for modulating said beat frequency signal pulses of said particular frequency upon the signal radiated by said third transmitter.

32. A wave signal transmission system, comprising three spaced transmitting units for radiating two pairs of signals, all of said signals having different frequencies, one of said units including means for alternately radiating one signal of each pair, means responsive to the signals radiated by said one unit and including modulation signal channels individually associated with the other units for alternately modulating the signals radiated by said other units with reference signals having different frequencies respectively related to the difference frequencies between the signals of said two pairs, and filter means included in each of said channels to pass only the desired reference signal.

33. In a position indicating system of the type requiring the transmission of signals from both position indicating transmitters which radiate position indicating signals and link transmitters which radiate reference signals, a pair of spaced transmitters for radiating position indicating signals, and means for alternately modulating the signals radiated by said pair of transmitters with reference signals, thereby to convert each of said pair of transmitters alternately from a position indicating signal transmitter to a link transmitter.

34. In a position indicating system of the type requiring the transmission of signals from both position indicating transmitters which radiate position indicating signals and link transmitters which radiate reference signals, a plurality of spaced transmitters for radiating position indicating signals, modulators individually associated with said transmitters and each operative to modulate the signal radiated by the associated transmitter with a reference signal, thereby to convert the associated transmitter into a link transmitter, and signal generating means remote from at least one of said transmitters for successively rendering said modulators effective to modulate the signals radiated by the respective associated transmitters with reference signals.

35. In a position indicating system of the type requiring the transmission of signals from both position indicating transmitters which radiate position indicating signals and link transmitters which radiate reference signals, a pair of spaced transmitters for radiating position indicating signals, modulators individually associated with said transmitters and each operative to modulate the signal radiated by the associated transmitter with a reference signal, thereby to convert the associated transmitter into a link transmitter, signal generating means remote from at least one of said transmitters for alternately rendering said modulators effective to modulate the signals radiated by the respective associated transmitters with reference signals, and means individually associated with said transmitters and controlled by said signal generating means for rendering each modulator ineffective to modulate the signal radiated by the associated transmitter during each interval when the other modulator is operating to modulate the signal radiated by the other transmitter.

36. Wave signal receiving apparatus for translating received space radiated waves into position indications, comprising a receiver for receiving a first pair of space radiated waves and for heterodyning said waves to produce a first heterodyne signal having a frequency related to a beat frequency between said waves, said receiver being alternately operative to receive and reproduce a first reference signal having a frequency representative of a beat frequency between a second pair of radiated waves and modulated upon one of said first pair of radiated waves, a second receiver for receiving and heterodyning said second pair of radiated waves to produce a second heterodyne signal having a frequency equaling the frequency of said first reference signal, said second receiver being alternately operative to receive and reproduce a second reference signal having a frequency representative of the beat frequency between said first pair of waves and modulated upon one of said second pair of waves, and position indicating means responsive to the heterodyne and reference signals produced by said two receivers for producing two indications respectively representative of the position of said receiving apparatus relative to two displaced sources of said waves.

JAMES E. HAWKINS.
ROBERT S. FINN.

REFERENCES CITED

The following references are of record in the file of this patent:

UNITED STATES PATENTS

| Number | Name | Date |
| --- | --- | --- |
| 684,706 | Mundy | Oct. 15, 1901 |
| 2,141,281 | Southworth | Dec. 27, 1938 |
| 2,148,267 | Honore | Feb. 21, 1939 |
| 2,379,362 | Lear | June 26, 1945 |
| 2,403,626 | Wolf et al. | July 9, 1946 |
| 2,405,238 | Seeley | Aug. 6, 1946 |
| 2,407,287 | Labin | Sept. 10, 1946 |
| 2,408,773 | Goodall | Oct. 8, 1946 |
| 2,417,807 | Brunner | Mar. 25, 1947 |
| 2,419,525 | Alford | Apr. 29, 1947 |
| 2,423,305 | Fletcher | July 1, 1947 |
| 2,433,381 | Marchand | Dec. 30, 1947 |

FOREIGN PATENTS

| Number | Country | Date |
| --- | --- | --- |
| 579,346 | Great Britain | July 31, 1946 |

Certificate of Correction

Patent No. 2,513,317                                                 July 4, 1950

JAMES E. HAWKINS ET AL.

It is hereby certified that error appears in the printed specification of the above numbered patent requiring correction as follows:

Column 6, line 29, for "heterdyning" read *heterodyning*; column 7, lines 32 and 33, for the word "transmitted" read *transmitter*; column 18, line 45, after "said" insert *first*;

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*